UNITED STATES PATENT OFFICE.

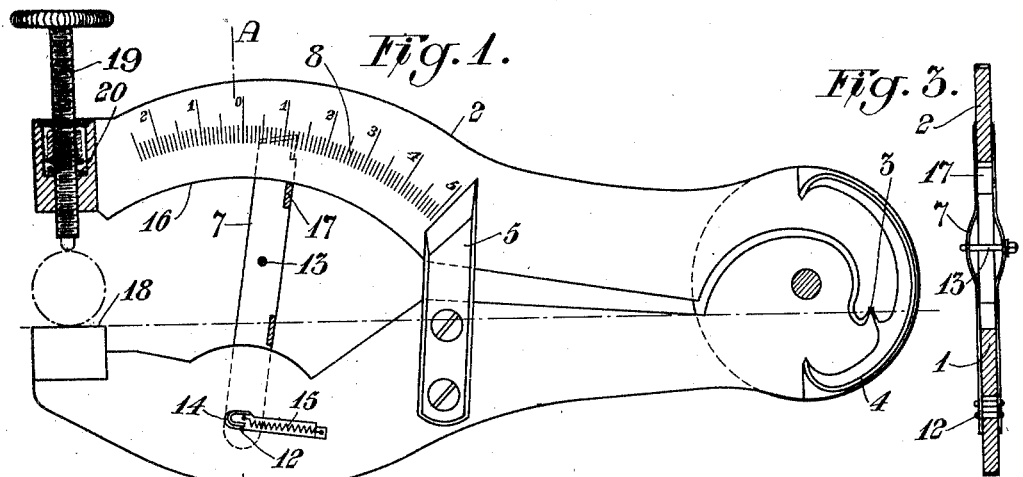
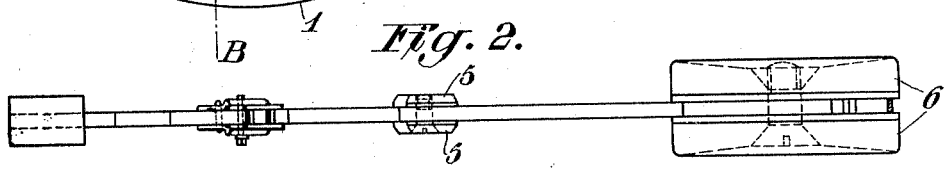
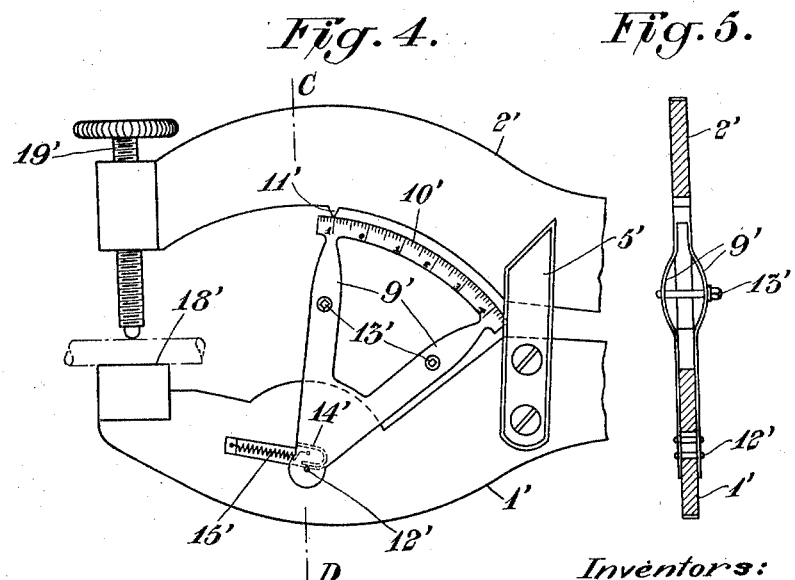

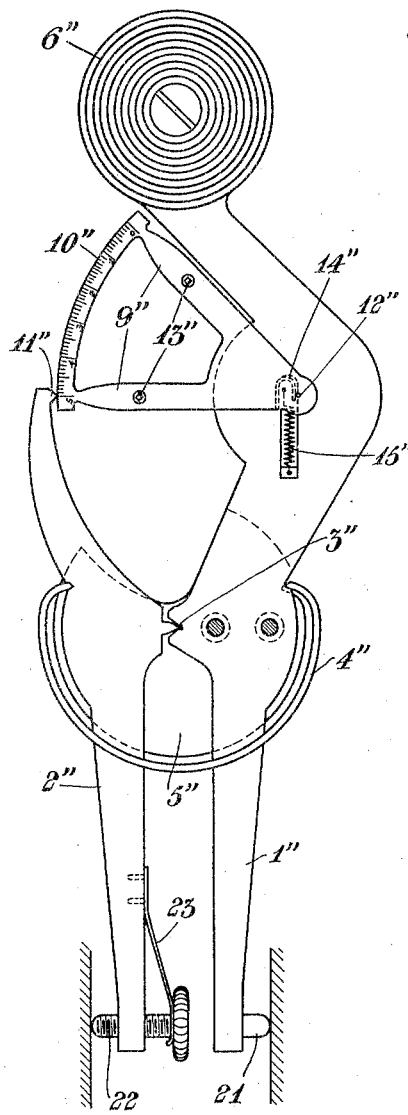
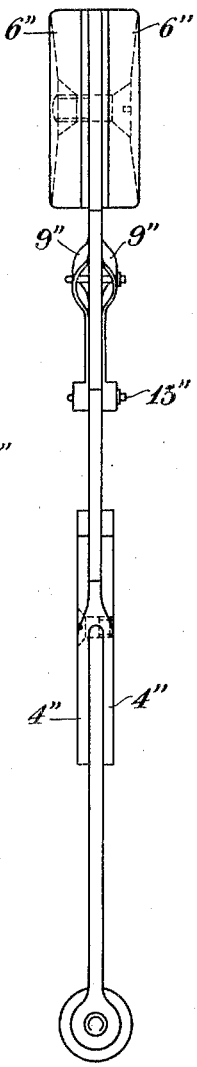

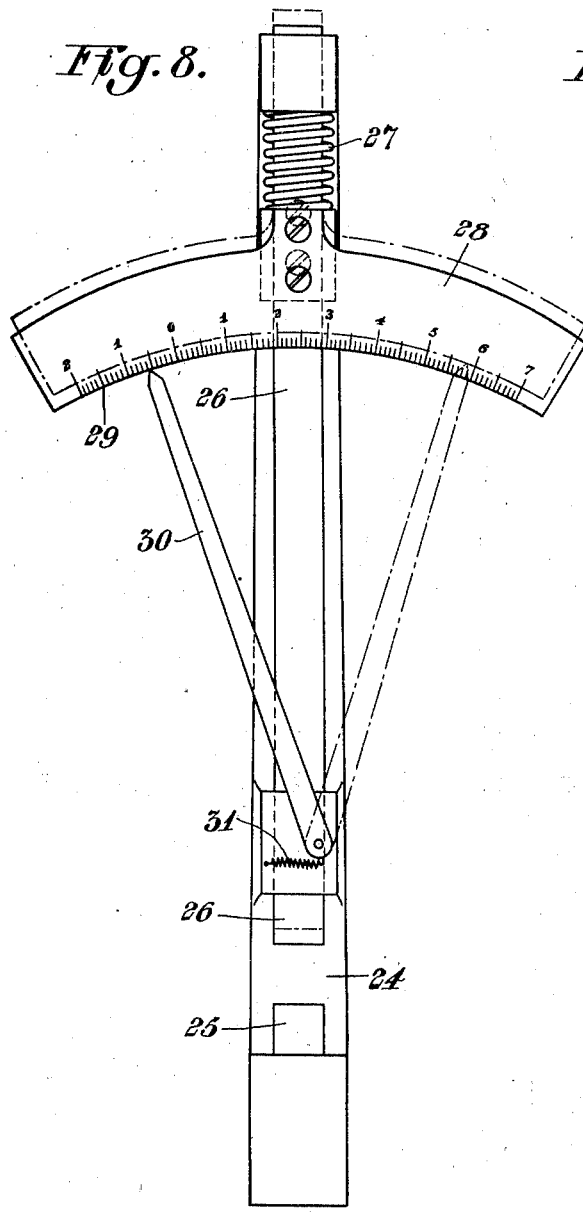
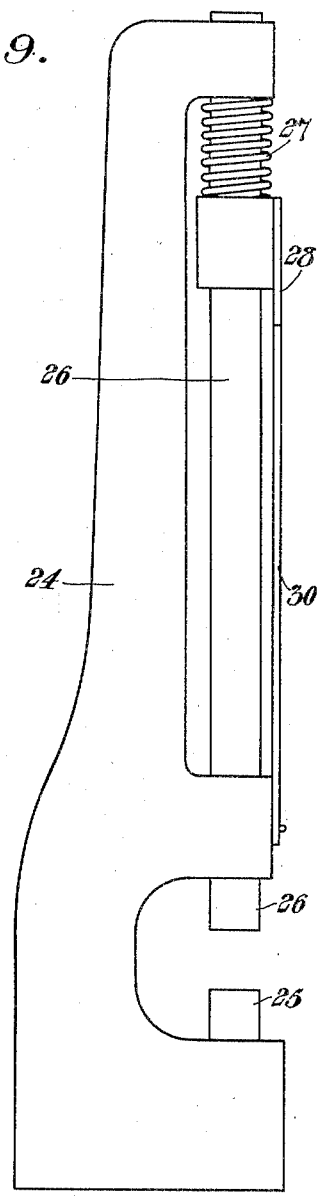

CARL EDVARD JOHANSSON AND FRANS GUSTAF HELMER SJÖKVIST, OF ESKILSTUNA, SWEDEN, ASSIGNORS, BY DIRECT AND MESNE ASSIGNMENTS, TO AKTIEBOLAGET C. E. JOHANSSON, OF ESKILSTUNA, SWEDEN, A MANUFACTURING COMPANY REGISTERED UNDER THE LAWS OF SWEDEN.

INDICATING DEVICE FOR MEASURING APPARATUS AND MEASURING-TOOLS.

1,334,955.     Specification of Letters Patent.     Patented Mar. 30, 1920.

Application filed December 8, 1916. Serial No. 135,750.

*To all whom it may concern:*

Be it known that we, CARL EDVARD JOHANSSON and FRANS GUSTAF HELMER SJÖKVIST, subjects of the King of Sweden, and residents of Eskilstuna, in the Kingdom of Sweden, have invented a new and useful Improvement in Indicating Devices for Measuring Apparatus and Measuring-Tools, of which the following is a specification.

This invention relates to improvements in gages and more particularly to indicating devices adapted for use in connection with accurate measuring tools or apparatus of the type which are provided with two measuring studs or the like, movable relatively to one another, and with a pointer and a graduated arc, one or the other of which is rotatable and actuated by a spring or other suitable means, said pointer and said arc each being connected directly or indirectly with one or the other of said measuring studs.

In the devices of this kind, as heretofore known, the spring actuating the pointer or the arc, as the case may be, tends to counteract the movement thereof from its initial position so that the same is immediately returned by said spring to such position when the gage is removed from the object being measured. Thus the reading of the dimension indicated must take place while the gage is still in contact with the piece of work being measured and accordingly the measurements are apt to be inaccurate, particularly when measuring pieces of work which, for instance, are set in a lathe or other machine and which are moving so that the measuring tool must be held in a convenient position for reading.

In contra-distinction hereto, the indicating device forming the subject of the present invention contemplates broadly a measuring tool wherein the graduated arc and the pointer are arranged eccentrically in such manner that, upon any change in the distance between the measuring studs caused when the gage is positioned on an object to be measured, the pointer or the arc, depending upon which of the two is rotatable relatively to the other, will be released and will automatically adjust itself, actuated by its spring, relatively to the arc or to the pointer, as the case may be, the same being maintained in such position after the gage is removed from the object being measured, whereby the indicating device becomes self-registering, so to speak, so that a convenient and accurate reading may afterward be made at one's ease.

The rotatable member (arc or pointer, as the case may be) is maintained in its indicating position by the friction created between it and the non-rotatable member (arc or pointer) when the two are forced into contact by the actuating spring, said rotatable member, when in such position, also serving as a support between the measuring studs so that these latter are also maintained separated after the gage is removed from the object measured. The pointer or the arc, becoming somewhat worn in the course of time, owing to the friction therebetween, the invention also contemplates means for changing the length of the pointer or the radius and eccentricity of the arc and thus compensating for the wear. The possibility of changing the eccentricity of the arc also provides the further advantage of rendering it possible to allow the graduations of the arc to denote any desired fractions of a millimeter.

In the accompanying drawings a few embodiments of the invention are shown by way of example. Figure 1 shows a side view, partly in section, of a tool for external measuring provided with two shanks pivotally connected to one another, and with an indicating device according to the invention, Fig. 2 shows a top edge view of the lower shank in Fig. 1, and Fig. 3 shows a sectional view on the line A—B in Fig. 1. Fig. 4 shows a somewhat modified construction of the measuring tool shown in Fig. 1, and Fig. 5 shows a sectional view on the line C—D in Fig. 4. Fig. 6 shows a side view partly in section of a measuring tool with pivoted shanks for internal measuring, and Fig. 7 shows an edge view of the same. Fig. 8 shows a front view, and Fig. 9 is a side view of a measuring tool with parallelly guided measuring studs.

The measuring tools according to the embodiments shown in Figs. 1 to 7 consist principally of a shank 1, 1', 1" intended to be seized with the hand when measuring, and another shank 2, 2', 2" pivotally connected to and bearing against the shank 1, 1', 1" by means of an edge or a stud 3, 3". The shanks are held together by an approximately semicircular spring 4, 4", which in the embodiments according to Figs. 1 and 4, for external measuring, tends to move both shanks toward one another, but in the embodiment according to Fig. 6 tends to move the shanks away from each other. In order to guide the shanks in lateral direction guides 5, 5', 5" are secured on either side of the shank 1, 1', 1", which guides receive the shank 2, 2', 2" but allow the same to turn freely on the edge 3. The guides 5, 5' according to Figs. 1 and 4 are approximately rectangular, but according to Fig. 6 the guides 5" are nearly circular. Insulating washers 6, 6" are secured in the usual manner to the shank 1, 1', 1" in order to prevent the heat of the hand from being transmitted to the measuring tool.

The indicating device consists in the embodiment shown in Fig. 1 of a pointer 7 which is fulcrumed to the shank 1 and is movable over a scale 8 on the other shank 2; in the embodiments illustrated in Figs. 4 and 6 the said device consists of a circular sector 9', 9" pivotally connected to the shank 1', 1" or to its rearward extension, Fig. 6, said sector being provided at its periphery with a scale 10', 10" and coacting with an edge 11', 11" on the other shank 2', 2" or on its rearward extension, Fig. 6, which edge serves as pointer at the same time. The pointer 7 as well as the sector 9', 9" consists of two parts located one on each side of the shank 1, 1', 1" and held together partly by means of a round pin 12, 12', 12" forming the axis of turning of the pointer, or the sector, and partly at the middle where the parts are bent outward to form arcs, Figs. 3, 5, and 7, and are held together by means of one screw 13, or two screws 13', 13" respectively. By tightening this screw 13, or these screws 13', 13", more or less, the length of the pointer 7, or the radius of the sector 9', 9" may be varied. The pin 12, 12', 12" rests in a slot in the shank 1, 1', 1" and is kept bearing against the bottom of the slot by means of a U-shaped flat spring 14, 14', 14" secured to the shank 1, 1', 1". The pointer 7 and the sector 9', 9" are actuated by a coil spring 15, 15', 15" which tends to turn the pointer 7 to the right in Fig. 1, but the sector 9', 9" to the left in Figs. 4 and 6.

In the embodiment illustrated in Fig. 1 the shank 2 bears with its inner circular edge 16 against a crosspiece 17 between the two lateral parts of the pointer 7, while in the embodiments according to Figs. 4 and 6 the edge 11', 11" on the shank 2', 2" bears against the arc of the circular sector 9', 9". The wear of these parts gradually caused during the use of the measuring tool, may be compensated by tightening the screw 13, or the screws 13', 13". The center of the arc 16 in Fig. 1 does not coincide with the fulcrum 12 of the pointer 7, but in the embodiment illustrated this latter point is located somewhat to the right of the center of the arc. As a result, if the shank 2 is removed from the shank 1, the pointer 7 will be swung to the right by the spring 15 and will stop only when the crosspiece 17 again bears against the edge 16. With a suitable mutual position of the two centers, the angle of turning of the pointer then becomes approximately proportional to the variation of the mutual distance between the shanks so that the scale 8 may be given an approximately uniform graduation, and the size of the angle of turning becomes dependent upon the eccentricity of the circular arc 16 relatively to the fulcrum of the pointer. By varying this eccentricity it is thus possible to let the divisions of the scale 8 represent thousandths, hundredths, or tenths of a millimeter, as wanted. In similar manner, in the embodiments according to Figs. 4 and 6 the center of the arc of the circular sector 9', 9" against which are the edge 11', 11" bears, is located somewhat to the right of the fulcrum 12', 12" of the sector, in Figs. 4 and 6, so that when the edge 11', 11" is moved away from the arc, the sector 9', 9" is automatically turned to the left by the spring 15', 15" until these parts are again bearing against one another. As regards the angle of rotation the observations above made in respect of the embodiment shown in Fig. 1, are also applicable in this case. Instead of using eccentric circular arcs 16, 9', 9" it is of course also possible to use spiral curves, although these may not be considered equally suitable from a point of view of manufacture.

In the embodiments according to Figs. 4 and 6 with rotatable sector the eccentricity of the sector arc may be varied in a simple manner by means of the two screws 13', 13", as one of the sector shanks may be shortened and the other lengthened so that the position of the arc may be made to correspond to any eccentricity which may be necessary.

In measuring tools for external measuring, Figs. 1 and 4, the shank 1, 1' is provided with a plane measuring surface 18, 18' forming one of the measuring studs and in the plane of which the edge 3 is located, while in the shank 2, 2' there is screwed a screw 19, 19' with fine thread and rounded point, said screw forming the other measuring stud. Lost motion of the screw is prevented by means of the spring 20 shown in Fig. 1. When it is desired to measure a work-piece with this measuring tool, the screw 19, 19' is first adjusted so that the pointer 7, or the edge 11', points to zero on the scale 8, or 10', when the opening between the surface 18, 18' and the point of the screw 19, 19' possesses the desired measure. The pointer 7, or the sector 9', is then moved back by hand to initial position, the pointer 7 farthest to the left in Fig. 1, and the sector 9' farthest to the right in Fig. 4, and the work-piece is introduced into the opening. When the pointer, or the sector, is then released, or when it becomes released owing to the introduction of the work-piece into the measuring opening, the pointer will immediately and automatically adjust itself in such manner that it is possible to read directly on the scale how much the work-piece differs from the desired measure in one direction or the other. This same result may also be noted after the measuring studs have been removed from the work by reason of the fact that the pointer or sector is maintained in its indicating position, until it is moved back to its initial position by hand.

In measuring tools for internal measuring according to Fig. 6 both shanks 1'' and 2'' are provided with measuring studs 21 and 22 the latter of which is threaded in order to be adjusted for various ranges of measurement and is actuated by a spring 23 for preventing lost motion. Both measuring studs are rounded so that they may be introduced for instance in a hole, after which the sector 9'' is automatically adjusted by the spring 15'' in the position corresponding to the diameter of the hole, in the manner above described.

The embodiment of the invention illustrated in Figs. 8 and 9, which is intended for external measuring, differs from the constructions above described mainly by this that the measuring studs are not supported by shanks fulcrumed to one another, but one of them, 26, is guided for rectilinear movement in the frame 24 of the measuring tool. The other stud 25 is immovably secured to the frame 24. The slidable stud 26 is acted upon by a spring 27 which tends to force it toward the other stud. The indicating means consists partly of a cross-piece 28 rigidly connected to the movable measuring stud 26 and the lower edge 29 of which is formed as an arc of a circle having its center in that plane of symmetry of the measuring stud which is at right angles to the cross-piece, and partly of a pointer 30 the fulcrum of which is at some distance to one side of said plane and supported by the frame 24 thereby being immovable with reference to the measuring stud 25. The pointer 30 is acted upon by a spring 31, which tends to turn the pointer toward the right with its outer end sweeping along beneath the curved edge 29 of the cross piece 28, but the pointer is prevented from thus turning beyond the point at which its outer end comes in contact with this curved edge.

It is obvious that if the fulcrum of the pointer was located in the center of the circular arc, the circle described by the end of the pointer would coincide with the circular arc of the cross-piece and the pointer would travel along the whole arc, if the cross-piece was raised sufficiently to remove the friction between these two parts. But when the fulcrum is located to the right of the center of the circular arc, as shown in Fig. 8, the circle described by the end of the pointer will intersect the circular arc of the cross-piece, and the farther to the side the fulcrum is located the greater becomes the angle of intersection. A slight separation of the measuring studs will thus not result in an unchecked movement of the end of the pointer along the circular arc, as the pointer will sooner or later again come into contact with the cross-piece at the intersection of the circles and is thus caused to stop. By suitably adjusting the eccentricity of the fulcrum relatively to the circular arc, it is possible to make the movement of the end of the pointer caused by the variation in the measuring opening, to amount to 10, 100, or 1000 times the actual variation of the measuring opening itself, and the scale graduated on the cross-piece may thus permit a distinct reading of even very small variations of the measuring opening. A reliable graduation will be obtained by successively placing gages with a constant variation of dimensions in the measuring opening and marking the position of the end of the pointer for every such gage by means of a division. For less accurate purposes it may be sufficient to mark the two end points of the scale and then to divide the distance in equal parts, as the indication of the pointer is practically proportional to the variation of the measuring opening.

It is obvious that in the embodiment last described the parts 28, and 30, may also be replaced by the edge 11' and the sector 9' according to Fig. 4, without influencing in any manner the function of the apparatus.

We claim:—

1. In a gage, the combination of a plurality of coöperating measuring arms, a rotatable member connected with one of said arms, a non-rotatable member connected with the other of said arms, said members being arranged eccentrically, means for maintaining said members in contact with each other and for advancing said rotatable member relatively to said non-rotatable member when said arms are separated in measuring an object, and means whereby said rotatable member is maintained in such advanced position after said gage is removed from the object measured.

2. In an indicating device for measuring apparatus and measuring tools, the combination of two co-acting measuring arms, a pointer fulcrumed to one of said arms, a graduated arc connected with the other of said arms and arranged eccentrically relatively to the fulcrum of said pointer, and a spring actuating said pointer so as to move the same to bear against said arc, said pointer, when moved into contact with said arc, maintaining its position owing to the friction therebetween and serving also as a support between said measuring arms.

3. In an indicating device for measuring apparatus and measuring tools, the combination of two co-acting measuring arms, a pointer fulcrumed to one of said arms, a graduated arc connected with the other of said arms and arranged eccentrically relatively to the fulcrum of said pointer, said pointer consisting of two members bent outwardly away from each other at the middle of said pointer, and a screw joining said members whereby the distance between the same may be varied, and a spring actuating said pointer so as to move the same to bear against said arc, substantially as and for the purpose set forth.

4. In an indicating device for measuring apparatus and measuring tools, the combination of two co-acting measuring arms, a pointer fulcrumed to one of said arms, a graduated arc connected with the other of said arms and arranged eccentrically relatively to the fulcrum of said pointer, a spring actuating said pointer so as to move the same to bear against said arc, said pointer, when moved into contact with said arc, maintaining its position, owing to the friction therebetween, and serving also as a support between said measuring arms, and means whereby the length of said pointer may be varied to thereby adjust the friction between it and said arc.

CARL EDVARD JOHANSSON.
FRANS GUSTAF HELMER SJÖKVIST.